United States Patent
Jegorel et al.

(10) Patent No.: US 12,180,110 B2
(45) Date of Patent: Dec. 31, 2024

(54) GLASS-CERAMIC ARTICLE

(71) Applicant: EUROKERA S.N.C., Chateau Thierry (FR)

(72) Inventors: Théo Jegorel, Paris (FR); Erwann Luais, Chateau Thierry (FR)

(73) Assignee: EUROKERA S.N.C., Chateau Thierry (FR)

( * ) Notice: Subject to any disclaimer, the term of this patent is extended or adjusted under 35 U.S.C. 154(b) by 529 days.

(21) Appl. No.: 17/441,521

(22) PCT Filed: Mar. 19, 2020

(86) PCT No.: PCT/EP2020/057562
§ 371 (c)(1),
(2) Date: Sep. 21, 2021

(87) PCT Pub. No.: WO2020/193347
PCT Pub. Date: Oct. 1, 2020

(65) Prior Publication Data
US 2022/0144695 A1    May 12, 2022

(30) Foreign Application Priority Data
Mar. 22, 2019 (FR) ...................... 1903010

(51) Int. Cl.
*C03C 17/22* (2006.01)
(52) U.S. Cl.
CPC ...... *C03C 17/225* (2013.01); *C03C 2217/281* (2013.01); *C03C 2217/78* (2013.01); *C03C 2218/156* (2013.01)
(58) Field of Classification Search
None
See application file for complete search history.

(56) References Cited

U.S. PATENT DOCUMENTS

| | | | |
|---|---|---|---|
| 5,070,045 A | 12/1991 | Comte et al. | |
| 2010/0297392 A1* | 11/2010 | Chen | C03C 17/28 428/210 |
| 2010/0304090 A1* | 12/2010 | Henn | C23C 14/0652 428/428 |
| 2017/0088460 A1* | 3/2017 | Maillet | C23C 14/083 |
| 2018/0194675 A1* | 7/2018 | Lorenzzi | B32B 7/023 |
| 2019/0218140 A1* | 7/2019 | Mercadier | C03C 17/3642 |

FOREIGN PATENT DOCUMENTS

| | | |
|---|---|---|
| EP | EP 0 437 228 A1 | 7/1991 |
| FR | FR 2 657 079 A1 | 7/1991 |
| FR | 3 038 597 A1 | 1/2017 |
| WO | WO 2008/053110 A2 | 5/2008 |
| WO | WO 2012/156444 A1 | 11/2012 |
| WO | WO 2014/096695 A2 | 6/2014 |
| WO | WO-2018024985 A1 * | 2/2018 ............. C03C 17/36 |

OTHER PUBLICATIONS

International Search Report as issued in International Patent Application No. PCT/EP2020/057562, dated May 28, 2020.
Musil, J., et al., "Structure and properties of magnetron sputtered Zr—Si—N films with a high (>25 at. %) Si content," Thin Solid Films, vol. 478, No. 1-2, May 2005, pp. 238-247.

* cited by examiner

*Primary Examiner* — David Sample
(74) *Attorney, Agent, or Firm* — Pillsbury Winthrop Shaw Pittman LLP

(57) ABSTRACT

A glass-ceramic article, includes at least one substrate, such as a plate, made of glass-ceramic, the substrate being coated in at least one zone with at least one layer including zirconium silicon nitride, $Si_xZr_yN_z$, with an atomic ratio of Zr to the sum Si+Zr, $y/(x+y)$, of 10% to 90%.

19 Claims, No Drawings

GLASS-CERAMIC ARTICLE

CROSS-REFERENCE TO RELATED APPLICATIONS

This application is the U.S. National Stage of PCT/EP2020/057562, filed Mar. 19, 2020, which in turn claims priority to French patent application number 1903010, filed Mar. 22, 2019. The content of these applications are incorporated herein by reference in their entireties.

The present invention relates to the field of glass-ceramics. More specifically, it relates to an article, or product, made of glass-ceramic, in particular a glass-ceramic plate intended to act as furniture surface and/or as cooking surface. The term "glass-ceramic article" or "article made of glass-ceramic" is understood to mean an article based on a substrate (such as a plate) made of glass-ceramic material, it being possible for said substrate, if appropriate, to be provided with additional accessories or elements, which are decorative or functional, required for its final use, it being possible for the article to denote both the substrate alone and that provided with additional fittings (for example a cooktop provided with its control panel, with its heating elements, and the like).

A glass-ceramic starts out as a glass, referred to as a precursor glass or parent glass or green-glass, the specific chemical composition of which makes it possible, through suitable heat treatments referred to as ceramization treatments, to bring about controlled crystallization. This specific partially crystalline structure confers unique properties on the glass-ceramic.

There currently exist different types of glass-ceramic plates, each variant being the result of major studies and of numerous tests, given that it is very problematic to modify these plates and/or the process by which they are produced without the risk of having an unfavorable effect on the properties desired: in particular, in order to be able to be used as cooktop, a glass-ceramic plate generally has to exhibit a transmission in the wavelengths of the visible region which is both sufficiently low to conceal at least a portion of the underlying heating elements when turned off and sufficiently high for, depending on the situation (radiant heating, induction heating, and the like), the user to be able to visually detect the heating elements in the operating state for the purpose of safety; it should also exhibit a high transmission in the wavelengths of the infrared region in the case in particular of plates having radiant heating elements. Glass-ceramic plates also have to exhibit a sufficient mechanical strength as required in their field of use. In particular, in order to be used as cooktop in the household electrical appliance field or as surface of a piece of furniture, a glass-ceramic plate has to exhibit a good resistance to pressure, to impacts (support and fall of utensils, and the like), and the like.

Conventionally, glass-ceramic plates are used as cooktops, or they can also be associated with heating elements in other applications, for example in order to form fireplace inserts. Recently, their use has extended to other areas of daily life: glass-ceramic plates can thus be used as furniture surfaces, in particular to form worktops, central islands, consoles, and the like, the surface area which they occupy in these new applications being greater than in the past.

Due to the repeated use of utensils at their surface (such as saucepans for cooktops or various household items for work surfaces), glass-ceramic plates can with use become scratched under the effect of friction with these utensils, indeed also become colored under the effect of friction with metals. As food may adhere to the surface of its plates or these plates may exhibit fingerprint problems, the use of cleaning products, such as more abrasive scouring sponges, can also be an additional source of scratches.

The plates can furthermore exhibit different coatings having a functional and/or decorative purpose, the commonest being enamels, based on glass frit and on pigments, and certain paints resistant to high temperature, for example based on silicone resins. Other coatings also exist, in particular based on layers or on stacks of layers, such as reflective layers in order to obtain contrast effects, but these coatings are generally more expensive and their manufacture is often more problematic. The fact of adding a coating can also complicate the maintenance of the plates, this being because it is possible for the coatings to be detrimentally changed during cleaning or to detrimentally change the optical or mechanical properties of the glass-ceramic.

An ongoing concern in the field of glass-ceramics, whether or not the glass-ceramic is coated, remains to be able to offer a product which is easy to maintain and which retains its appearance and its properties over time.

The present invention has attempted to overcome the above disadvantages of glass-ceramic plates in terms of damage related to the friction of utensils (scratches, coloration by metal friction) by providing an improved glass-ceramic plate, in particular a new glass-ceramic plate, intended to be used with one or more heating elements, such as a cooktop, or intended to act as furniture surface, this plate making it possible to limit the appearance of scratches at its surface in its daily use and also to limit the appearance of colorations due to friction with metal utensils, without, however, harming the other properties desired for its use or harming its esthetic appearance.

This aim is achieved by virtue of the glass-ceramic product developed according to the invention, in which the appearance of scratches or colorations is reduced by the application of a specific coating, said coating being selected according to precise criteria in order to obtain the desired effect. This is because the inventors have demonstrated that the addition of zirconium in a layer of hard material (material, for example, of silicon and/or aluminum nitride type) deposited at the surface of the glass-ceramic, and in particular the deposition or the presence at the surface of the glass-ceramic (in particular on the face intended to be in contact with utensils, generally the upper face of the plate) of a layer comprising zirconium silicon nitride with a certain atom is proportion of zirconium, had very favorable effects on the reduction of scratches and on the reduction of coloring effects due to frictional actions with metal.

The present invention thus relates to a new glass-ceramic article, comprising at least one substrate, such as a plate, made of glass-ceramic, said substrate being coated in at least one zone with at least one layer comprising zirconium silicon nitride, $Si_xZr_yN_z$, with an atomic ratio of Zr to the sum Si+Zr, $y/(x+y)$, of 10% to 90% (or, in other words, of between 10% and 90%, limits included, or also within a range extending from 10% to 90%), preferably of 15% to 50% and in particular of 28% to 33%.

The layer deposited according to the invention increases the durability of the plates by making it possible both to considerably reduce the appearance of scratches and to limit the appearance of colorations due to the frictional actions of metal utensils (such as saucepans).

The product according to the invention also exhibits good adhesion of the layer to the glass-ceramic substrate (without the need for prior treatment of the support and/or the use of an adhesion promoter, of a tie layer or of a primer) or to any adjacent layer possibly present on the substrate. This layer/coating does not in particular show any delamination after a thermal shock (for example in the vicinity of 600° C.), and withstands high temperatures. The coated substrate exhibits good thermal stability and can be used with different heating sources (induction, radiant, and the like). Moreover, the layer/coating does not mechanically weaken the glass-ceramic substrate.

The abovementioned layer is advantageously essentially formed (to at least 85% by weight), indeed even solely formed (with the exception of the impurities possibly present which in this case do not represent more than 5% of the layer), of silicon, zirconium and nitrogen, and is subsequently referred to more simply as "zirconium silicon nitride layer". The designation "zirconium silicon nitride" does not exclude, if appropriate, the presence of other chemical elements, nor does it prejudge the actual stoichiometry of the layer. The zirconium silicon nitride layer can in particular be doped or comprise a small amount of one or more chemical elements, typically aluminum or boron, added as dopants in the targets used, with the aim of increasing their electron conductivity and of thus facilitating the deposition by the magnetron cathode sputtering technique. The layer selected according to the invention is in particular either a layer made of (or of) zirconium silicon nitride, $Si_xZr_yN_z$, or a layer made of zirconium silicon nitride doped with aluminum, $Si_xZr_yN_z$:Al. The content of dopant(s) (in particular aluminum) is, however, less than 15% by weight (in the target and in the layer), preferably less than 10% by weight, indeed even zero. More generally, the content of component(s) other than silicon, zirconium and nitrogen in the layer is less than 15% by weight, preferably less than 10% by weight, indeed even zero.

The atomic ratio of Zr to the sum Si+Zr, y/(x+y), in the zirconium silicon nitride layer selected according to the invention is from 10% to 90%, preferably from 15% to 50% and in particular from 28% to 33%, as indicated above. Such a layer can in particular be deposited with a target comprising, for example, from 85 atom % to 60 atom % of Si per 15 atom % to 40 atom % of Zr; this target being sputtered in a nitrogen-containing atmosphere.

Said layer selected according to the invention can additionally exhibit a nitridation z ranging in particular from 4/3(x+y) to 5/3(x+y).

The zirconium silicon nitride layer (or each zirconium silicon nitride layer, if there are several of them, as specified later) used to coat the glass-ceramic for the purposes of improving the durability of said glass-ceramic is advantageously a thick layer, especially thicker than the thin layers usually deposited by magnetron (the (physical) thickness of which does not exceed of the order of 100 nm), the (physical) thickness of said layer being in particular within a range extending from 200 to 5000 nm, especially from 700 to 2500 nm and preferably from 1000 to 1500 nm.

Advantageously, the zirconium silicon nitride layer according to the invention exerts a hardness H of greater than 14 GPa and in particular of greater than 20 GPa, indeed even of greater than 30 GPa. This layer also exhibits a modulus of elasticity E of greater than 140 GPa, especially of greater than 150 GPa, indeed even of 200 GPa or more, the hardness H and the elastic modulus E being measured using a nanoindenter of DCMII-400 type sold by CSM Instruments, the tip used being a pyramidal diamond tip of 3-sided Berkovich type, according to the standard NF EN ISO 14577, on the layer deposited as a flat tint (with a degree of cover of 100%) on the glass-ceramic.

In the present invention, a single zirconium silicon nitride layer is in particular sufficient to obtain the improvements according to the invention. The term "layer" is understood to mean a uniform layer of one and the same material, even if, for example, said layer has been obtained in several passes starting from one and the same target. The coating including the layer selected according to the invention can thus advantageously contain only a single layer comprising zirconium silicon nitride, indeed even contain only said layer.

However, it is not excluded to use several zirconium silicon nitride layers within the same coating for the purposes of obtaining the improved product according to the invention, or to use a stack of layers including the abovementioned layer and one or more other layers (or, in other words, one or more other layers on or under the abovementioned zirconium silicon nitride layer), the coating (or the stack) formed by these layers increasing the durability of the plates by the presence of the zirconium silicon nitride layer according to the invention.

The coating including at least one zirconium silicon nitride layer according to the invention can, for example, comprise, between the substrate and a layer as mentioned above, at least one layer, or a stack of layers, which influences, for example, the appearance in reflection of the plate or which can be used to block a possible migration of ions or which can act as adhesion layer, and the like, such as a layer of silicon oxynitride or of silicon nitride or also an adhesion layer made of silica or $SiO_x$, the (physical) thickness of this or these layers preferably being within a range extending from 1 to 30 nm.

In the case where the coating comprises several zirconium silicon nitride layers (that is to say, layers comprising zirconium silicon nitride $Si_xZr_yN_z$), the atomic ratio of Zr to the sum Si+Zr, y/(x+y), for each of these layers is preferably from 10% to 90%, but it is not necessarily the same for all these layers comprising zirconium silicon nitride (it is thus possible for the ratio y/(x+y) to be different for two layers present comprising zirconium silicon nitride $Si_xZr_yN_z$).

In an advantageous embodiment, the zirconium silicon nitride layer or at least one zirconium silicon nitride layer according to the invention is deposited directly in contact with the substrate made of glass-ceramic (or, in other words, in the product, is (directly) in contact with said glass-ceramic), in at least one of its faces (preferably on its face intended to be turned toward the user in the position of use, or upper or external face, the other (lower or internal) face being generally hidden in the position of use), without other underlying coating layer.

In another alternative or cumulative embodiment, the zirconium silicon nitride layer or at least one layer incorporating zirconium silicon nitride according to the invention constitutes the exterior layer (or external layer, that is to say the layer of the coating located on the atmosphere side or also the layer furthest away from the glass-ceramic or the visible layer) of the coating including it present on the glass-ceramic.

The abovementioned layer can alternatively be coated with one or more other layers (atmosphere side). In a particularly advantageous embodiment, the coating deposited on the glass-ceramic substrate according to the invention thus comprises, in addition to a zirconium silicon nitride layer according to the invention, a, or at least one, layer (in particular exterior layer) having a low coefficient of friction (less than 0.25), such as a layer of or based on: titanium oxide $TiO_x$ or $TiZrO_x$ or BN or $ZrO_x$ (it being possible for one or other of these layers to also be doped), and the like, this layer exhibiting lubricating properties and the presence of this layer making it possible to further reduce the sensitivity to scratching and to coloration of the stack, the thickness of this layer being preferably less than 20 nm, in particular less than or equal to 10 nm, preferably of between 2 and 10 nm, in particular of the order of 4-8 nm. In particular, the coating on the glass-ceramic substrate according to the invention can consist only of a combination of the following two layers: a zirconium silicon nitride layer as defined according to the invention, in contact with the glass-ceramic, and a layer having a coefficient of friction of less than 0.25, atmosphere side, the layer having a low coefficient of friction coating the zirconium silicon nitride layer according to the invention. The coefficient of friction is measured using a CSM microscratch device sold by CSM Instruments, a constant force of 1N being applied to a stainless steel ball with a diameter of 1 cm moving over a distance of 2 cm at constant speed, thirty passes (15 to-and-fro motions) being carried out in all, the coefficient of friction being the ratio of the tangential force to the normal force measured by sensors.

Different embodiments described above can, of course, be combined with one another. Preferably, the coating deposited for the purposes of obtaining the improved properties according to the invention consists of the single zirconium silicon nitride layer defined according to the invention or else, successively starting from the substrate, of said layer and of a layer having a low coefficient of friction (less than 0.25) (for example $TiO_2$), as described above.

The total thickness of the coating (including the layer and optional other layers) is preferentially between 200 and 5000 nm.

The layer or the coating (or the stack) incorporating the layer can cover only a part of the substrate, or an entire face (in particular a main face), for example the upper face in the position of use, which is particularly subject to cleaning. In particular, the substrate made of glass-ceramic is provided on its upper or external face with said zirconium silicon nitride layer according to the invention, alone or forming part of a stack of layers.

The glass-ceramic article (or product) according to the invention is in particular a cooktop, or a cooking device or apparatus, or any furniture article incorporating (or comprising, or formed of) at least one substrate made of glass-ceramic (material) (the substrate being most commonly in the form of a plate, coming to be incorporated or to be assembled in the piece of furniture and/or combined with other elements in order to form the piece of furniture), it being possible for said substrate, if appropriate, to exhibit zones having a display character (in combination, for example, with light-emitting sources) or decorated zones or to be combined with heating elements. In its commonest application, the article according to the invention is intended to act as cooktop, this plate generally being intended to be incorporated in a cooking surface or kitchen range also comprising heating elements, for example radiant or halogen heat sources or induction heating elements. In another advantageous application, the article according to the invention is a worktop made of glass-ceramic or a central island, if appropriate with different displays and without necessarily cooking zones, indeed even a console-type piece of furniture (the substrate forming, for example, the upper part), and the like.

The substrate (or the article according to the invention itself, if it is formed only of the substrate) is generally (in the form of) a plate, intended in particular to be used with, especially to cover or receive, at least one light source and/or one heating element or intended to act as furniture surface.

This substrate (or respectively this plate) is generally of geometric shape, in particular rectangular, indeed even square, indeed even circular or oval, and the like, shape, and generally exhibits a face turned toward the user in the position of use (or visible or external face, generally the upper face in the position of use), another face which is generally hidden, for example in a furniture framework or casing, in the position of use (or internal face, generally the lower face in the position of use), and an edge face (or edge or thickness). The upper or external face is generally flat and smooth but may also locally exhibit at least one protruding zone and/or at least one recessed zone and/or at least one opening and/or beveled edges, and the like, these variations in shape constituting in particular continuous variations in the plate. The lower or internal face can also be flat and smooth or provided with pins. The thickness of the glass-ceramic substrate is generally at least 2 mm, in particular at least 2.5 mm, and is advantageously less than 15 mm, especially is of the order of 3 to 15 mm, in particular of the order of 3 to 8 mm or of the order of 3 to 6 mm. The substrate is preferably a flat or virtually flat plate (especially with a deflection of less than 0.1% from the diagonal of the plate, and preferably of the order of zero).

The substrate can be based on any glass-ceramic, this substrate advantageously exhibiting a zero or virtually zero CTE, especially of less than (in absolute value) $30\cdot10^{-7}$ $K^{-1}$ between 20 and 700° C., in particular of less than $15\cdot10^{-7}$ $K^{-1}$, indeed even of less than $5\cdot10^{-7}$ $K^{-1}$, between 20 and 700° C.

The invention is particularly advantageous for substrates of dark appearance where the scratches are more easily seen, these substrates having low transmissions and weak scatterings, and being in particular based on any glass-ceramic having, intrinsically, a light transmission TL of less than 40%, especially of less than 5%, in particular from 0.2% to 2%, for glass-ceramics up to 6 mm in thickness, and an optical transmission (determined in known way by taking the ratio of the transmitted intensity to the incident intensity at a given wavelength) between 0.5% and 3% for a wavelength of 625 nm within the visible region. The term "intrinsically" is understood to mean that the substrate has such a transmission in itself, without the presence of any one coating. The optical measurements are carried out according to the standard EN 410. In particular, the light transmission TL is measured according to the standard EN 410 using illuminant D65 and is the total transmission (in particular integrated over the visible region and weighted by the curve of sensitivity of the human eye), taking into account both direct transmission and possible diffuse transmission, the measurement being carried out, for example, using a spectrophotometer equipped with an integrating sphere (in particular with the spectrophotometer sold by Perkin-Elmer under the reference Lambda 950).

In particular, the substrate is a substrate of black or brown appearance, making it possible, in combination with light sources placed below, to display light zones or decorations, while masking possible underlying elements. It can in particular be based on a black glass-ceramic comprising crystals of β-quartz structure within a residual vitreous phase, the absolute value of its expansion coefficient advantageously being less than or equal to $15\cdot10^{-7}K^{-1}$, indeed even $5\cdot10^{-7}K^{-1}$, such as the glass-ceramic of the plates sold under the KeraBlack+ name by Eurokera. It can in particular be a glass-ceramic with a composition as described in the patent application EP 0 437 228 or U.S. Pat. No. 5,070,045 or FR 2 657 079, or a glass-ceramic refined with tin exhibiting a content of arsenic oxides preferentially of less than 0.1%, as described, for example, in the patent application WO 2012/156444, or also a glass-ceramic refined with sulfide(s), as described in the patent application WO2008053110, and the like.

The present invention can also be applied in the case where the substrate is lighter, for example for a transparent substrate, if appropriate coated with an opacifying coating, generally made of paint, on its lower face, such as a plate sold under the Keralite® name by Eurokera.

According to the invention, the glass-ceramic substrate under consideration is coated in one or more zones (or at least one zone of said substrate is coated), more particularly at the surface, on at least a part of a face, advantageously on at least a part of the face turned toward the user in the position of use and/or requiring a reduction in the visibility of scratches and colorations, generally the upper or external face in the position of use, and in particular is coated over the whole of said face. It is coated with at least (or by at least) one layer defined according to the invention or a coating comprising said layer.

The substrate according to the invention can, if appropriate, be coated with other coatings or layers having a functional effect (anti-overflow layer, opacifying layer, and the like) and/or decorative effect, in particular which are localized, such as usual patterns based on enamels (for example, in the upper face, in order to form logos or simple patterns) or a layer of opacifying paint on the lower face of the substrate, and the like. In particular, the substrate can be coated with at least one layer of enamel and/or of paint, in particular of luster type, localized or not, at least in part or entirely on (in particular atmosphere side) or under (in particular in contact with the substrate) the layer defined according to the invention or (at least in part or entirely) on or under the stack including said layer according to the invention, it being possible for said layer of enamel or paint/luster to be in contact with the layer according to the invention. The term "paint of luster type" is understood in particular to mean a paint formed of metal oxides and devoid of pigments, this paint or luster exhibiting in particular a refractive index of greater than 1.54. The thickness of such a layer of paint can in particular be between 10 and 100 nm.

The article according to the invention can additionally comprise, associated or combined with the substrate, one or more light sources and/or one or more heating elements (such as one or more radiant or halogen elements and/or one or more atmospheric gas burners and/or one or more induction heating means), generally placed in the lower face of the substrate. The source or sources can be incorporated in or coupled to one or more display-type structure(s), to a touch-sensitive digital-display electronic control panel, and the like, and are advantageously formed by light-emitting diodes, which are more or less spread out, optionally associated with one or more optical guides.

The article can also be provided with (or associated with) additional functional element(s) (frame, connector(s), cable(s), control element(s)), and the like).

The invention has thus made possible the development of a glass-ceramic product having a surface more resistant to scratches and colorations at the desired locations (for example over the whole of a face or over only a few zones, for example zones more exposed to handling operations or scratches, such as heating zones), at the same time as the product retains a mechanical strength as required for various uses (in particular for its use as a cooktop). The solution according to the present invention thus makes it possible to obtain, in a simple and economical manner, without complex operation (it being possible for the layer to be deposited by deposition techniques under reduced pressure, such as cathode sputtering, as indicated later), in a durable manner and with high flexibility, zones of greater resistance to scratches and colorations in any desired zone of the product, this being the case even when these zones are intended to be subjected to high temperatures. The article according to the invention exhibits in particular a good thermal resistance compatible with the use of various types of heating procedures, and does not present maintenance problems. The product according to the invention especially does not undergo thermal degradation at temperatures of greater than 400° C. which can be achieved in particular in applications such as the use as cooktops.

The present invention also relates to a process for the manufacture of the glass-ceramic article according to the invention, starting from a substrate made of glass-ceramic, in which there is deposited (or applied), on (or to) at least one zone of said substrate, at least one layer as selected according to the invention. The application or deposition of the layer (or, if appropriate, of each layer) of zirconium silicon nitride according to the invention can be carried out by any appropriate and rapid technique which makes it possible in particular to produce uniform layers or flat tints of layers of this type, in particular by a process for deposition under reduced pressure, such as cathode sputtering, in particular magnetron-enhanced, or also chemical vapor deposition (CVD), if appropriate plasma-enhanced (PECVD), the application preferably being carried out by cathode sputtering, in particular magnetron-enhanced, this deposition being carried out with a good yield and a good rate of deposition. The other optional layers of oxides or nitrides of the same coating can also be deposited, if appropriate, by the same method of deposition (the depositions being in particular successive), the other layers optionally present (enamel, luster) on the substrate being deposited independently by any usual technique (such as screen printing or inkjet printing for the enamels).

The cathode sputtering preferentially used is in particular of the AC (alternating current) or DC (direct current) type or in a particularly preferred way of pulsed DC type, according to the type of generator employed to polarize the cathode. The targets are, for example, planar.

The deposition of the layer (or of each layer) of zirconium silicon nitride is carried out in particular using a silicon zirconium target, comprising an atomic ratio of Zr to the sum Si+Zr, $y/(x+y)$, which is from 10% to 90%, in an atmosphere consisting of plasmagen gas (generally argon) and nitrogen. In particular, use is made of a silicon zirconium target, if appropriate doped with aluminum or boron in order to increase its electron conductivity, in an atmosphere consisting of argon and nitrogen.

The active entities of the plasma, by bombarding the target, tear off said elements, which are deposited on the substrate with the formation of the desired layer and/or react with the gas contained in the plasma in order to form said layer. Advantageously, the atmosphere (formed of plasmagen gas) during the deposition, in the chamber where the deposition in question is taking place, comprises less than 1% by volume of oxygen (which may be residual in the chamber or optionally supplied), indeed even is devoid of oxygen. Preferably, the oxygen flow rate during the deposition of the layer is zero, or in other words there is no oxygen intentionally introduced into the sputtering atmosphere of said target.

The pressure of deposition (or during the deposition) of the layer according to the invention is in particular at most 2.5 µbar, preferably is within a range extending from 1.5

μbar to 2.3 μbar. The term "pressure of deposition" is understood to mean the pressure prevailing in the chamber where the deposition of this layer is carried out. The application of the pressure selected in the deposition chamber(s) concerned contributes to obtaining a layer exhibiting a good mechanical and abrasion resistance.

The power of deposition of the layer(s) is also preferably within a range extending from 2 to 10 W/cm² of target, during the deposition of said layers, and the rate of forward progression of the substrate under the various targets is preferentially within a range extending from 0.1 to 3 m/min.

The deposition is carried out in particular on the preceramized and unheated substrate. According to a particularly preferred embodiment, the coated substrate is subsequently subjected to a heat treatment, in particular to a tempering treatment or an annealing, at a temperature for example of the order of 750° C. to 900° C., for approximately ten minutes, this treatment making it possible to relax the stresses and to further increase the hardness of the layer according to the invention.

For the record, the manufacture of glass-ceramic plates is generally carried out as follows: the glass with the composition chosen in order to form the glass-ceramic is melted in a melting furnace, the molten glass is then rolled to give a standard ribbon or sheet by passing the molten glass between rolling rolls and the glass ribbon is cut to the desired dimensions. The plates, thus cut, are subsequently ceramized in a way known per se, the ceramization consisting in firing the plates according to the thermal profile chosen in order to convert the glass into the polycrystalline material known as "glass-ceramic", the coefficient of expansion of which is zero or virtually zero and which withstands a thermal shock which can in particular range up to 700° C. The ceramization generally comprises a stage in which the temperature is gradually raised up to the nucleation range, a stage of passing through the nucleation interval (for example between 650° C. and 830° C.) in several minutes (for example between 5 and 60 minutes), a further rise in the temperature in order to make possible the growth of the crystals (ceramization in an interval ranging, for example, from 850° C. to 1000° C.), with maintenance of the temperature of the ceramization stationary phase for several minutes (for example from 5 to 30 minutes), and then a rapid cooling down to ambient temperature.

If appropriate, the process also comprises a cutting operation (generally before ceramization), for example using a jet of water, mechanical marking using a cutting wheel, and the like, followed by a shaping operation (grinding, beveling, and the like).

The following examples illustrate the present invention without limiting it.

In these examples, small 20 cm by 20 cm plates of the same substrate formed of a translucent black glass-ceramic, sold under the reference KeraBlack+ by Eurokera, were used, these small plates exhibiting a smooth upper face and a lower face provided with pins and a thickness of 4 mm.

A thick layer, with a thickness of 1200 nm, of $Si_xZr_yN_z$ with an atomic ratio of Zr to the sum Si+Zr, y/(x+y), of 32% was deposited on these small plates by pulsed-DC magnetron-enhanced cathode sputtering at low pressure of the order of 2 μbar, with a power density per unit area of the target of less than 6 W/cm² and a nitrogen content of between 55% and 65%.

The hardness H and the elastic modulus E of the bare glass-ceramic and then of the glass-ceramic provided with the preceding layer were subsequently measured using a nanoindenter of DCMII-400 type, the tip used being a pyramidal diamond tip of Berkovich type (3 sides) according to the standard NF EN ISO 14577.

It was observed that the bare glass-ceramic has a hardness of 7.5 GPa and that the deposition of a thick layer of zirconium silicon nitride made it possible to increase the hardness up to approximately 14.5 GPa. The modulus of elasticity (or elastic modulus) E of the layer was 140 GPa.

An annealing (or tempering) at 850° C. for 10 min was subsequently carried out on the coated glass-ceramic, resulting in even higher values of hardness on the coated substrate and of modulus of elasticity E of the layer: H=15.5-20.5 GPa and E=155 GPa.

The abrasion resistance of these samples was also measured using an abrasive paper of P800 type sold by Norton and incorporating silicon carbide grains with a mean equivalent diameter of 20 μm, by making a paper to-and-fro motion over the surface of the glass-ceramic (bare or coated) over a distance of 3.81 cm at a rate of 15 to-and-fro motions per minute and an applied pressure of 5 N/cm². The measurements in terms of number of scratches were made from photos taken by illuminating the samples using 3-color light-emitting diodes in a light box, image processing (binarized in black and white and making it possible to reveal the scratches in black pixels and the unscratched part in white pixels) making it possible to analyze the photographs taken. A "scratchability index" was evaluated giving an index x corresponding to the number y of black pixels recorded on an image composed of 132 000 pixels divided by 10 000 (x=y/10 000, the index x being, for example, 1 when there are 10 000 black pixels, 2 when there are 20 000 black pixels, and the like), the bare glass-ceramic obtaining an index of 4 whereas the coated glass-ceramic in accordance with the invention obtained an index of 2 before annealing heat treatment and of 1 after annealing heat treatment at a temperature of the order of 850° C. for approximately ten minutes, thus showing a considerable reduction in the number of scratches in comparison with a bare glass-ceramic.

The coefficient of friction was also measured using a CSM microscratch device sold by CSM Instruments. A constant force of 1N was applied to a stainless steel ball with a diameter of 1 cm moving over a distance of 2 cm at constant speed, thirty passes being carried out in all. The coefficient of friction measured was the ratio of the tangential force applied to the normal force applied, which forces are measured by sensors. The coefficient of friction measured for the bare glass-ceramic (glass-ceramic/metal contact) was 0.3 and that for the coated glass-ceramic was lowered to 0.2. By way of comparison, that obtained by using, as coating, in place of the layer according to the invention, a hard coating of the same thickness based on SiN (without zirconium) obtained a higher coefficient, equal to 0.4.

These same samples were subjected to a metal friction test on a reference 5750 Linear Abraser device (sold by Taber) with a flat stainless steel wiper, the arm carrying the wiper travelling 3.81 cm at a rate of 60 cycles per minute, with an application force of 2 MPa. The test consisted in carrying out to-and-fro motions and in determining the number of cycles from which a metal deposit was observed at the surface, this test making it possible to simulate the movement of a saucepan at the surface of a glass-ceramic, the movements of saucepans generating two types of damage: scratches in the form of metal deposits resulting from the saucepan, and plastic deformation or cracks or abrasions of the glass-ceramic.

On the bare glass-ceramic, the wiper scratched the surface in less than approximately twenty cycles, just as for samples with only a deposit (of the same thickness as the layer according to the invention tested) of $TiO_x$ or of $TiZrO_x$, the sample carrying a layer of SiN bringing about metal deposits after approximately thirty cycles.

The sample according to the invention (provided with the abovementioned layer of SiZrN) was scratched only from approximately sixty cycles, i.e. twice as many cycles as the best of the preceding comparative samples.

The addition to the abovementioned layer of SiZrN of a layer of $TiO_x$ or $TiZrO_x$ with a thickness of 5 nm, having a coefficient of friction of 0.17 and 0.15 respectively, further made it possible to improve these results, in particular making it possible to go even beyond approximately a hundred cycles.

Various cleaning tests on surfaces carrying traces of coffee, milk, vinegar, burnt tomato sauce, under cold and hot conditions, with different household products (such as the VitroClen brand products from Reckitt Benckiser or an induction and glass-ceramic cleaning product from Kiraviv) have also demonstrated that the glass-ceramic coated with the layer selected according to the invention was easy to clean and that the layer did not degrade chemically. Likewise, this layer did not delaminate after thermal shocks at 620° C., nor did it show degradation after 100 h at 580° C.

The articles according to the invention can in particular be used with advantage to produce a novel range of cooktops for kitchen ranges or cooking surfaces or a novel range of work tables, consoles, credenzas, central islands, and the like.

The invention claimed is:

1. A glass-ceramic article, comprising at least one substrate made of glass-ceramic, said substrate being coated in at least one zone with at least one layer comprising zirconium silicon nitride, $Si_xZr_yN_z$, with an atomic ratio of Zr to the sum Si+Zr, y/(x+y), of 10% to 90%, wherein a thickness of said layer is within a range extending from 200 to 5000 nm.

2. The glass-ceramic article as claimed in claim 1, wherein said layer is a zirconium silicon nitride layer, essentially formed to at least 85% by weight, with the exception of the impurities possibly present which do not represent more than 5% of the layer, of silicon, zirconium and nitrogen.

3. The glass-ceramic article as claimed in claim 1, wherein said layer exhibits a hardness H of greater than 15 GPa and a modulus of elasticity E of greater than 140 GPa.

4. The glass-ceramic article as claimed in claim 1, wherein the coating including said layer contains only a single layer comprising zirconium silicon nitride.

5. The glass-ceramic article as claimed in claim 1, wherein the substrate is coated with at least one layer of enamel and/or of paint on or under said layer comprising zirconium silicon nitride.

6. The glass-ceramic article as claimed in claim 1, wherein said layer is directly in contact with said substrate made of glass-ceramic, without other underlying coating layer.

7. The glass-ceramic article as claimed in claim 1, wherein said layer, or at least one layer incorporating zirconium silicon nitride, constitutes an exterior layer of the glass-ceramic.

8. The glass-ceramic article as claimed in claim 1, wherein said layer is coated with at least one layer having a coefficient of friction of less than 0.25.

9. The glass-ceramic article as claimed in claim 1, wherein said layer exhibits a nitridation z ranging from 4/3 (x+y) to 5/3 (x+y).

10. The glass-ceramic article as claimed in claim 1, wherein a content of dopant(s) in a target used, as well as in the layer, or a content of other component(s) in the layer, being less than 15% by weight.

11. The glass-ceramic article as claimed in claim 1, wherein the substrate is a plate.

12. The glass-ceramic article as claimed in claim 1, wherein the atomic ratio of Zr to the sum Si+Zr, y/(x+y) is from 15% to 50%.

13. The glass-ceramic article as claimed in claim 12, wherein the atomic ratio of Zr to the sum Si+Zr, y/(x+y) is 28% to 33%.

14. The glass-ceramic article as claimed in claim 1, wherein the thickness of said layer is within a range extending from 700 to 2500 nm.

15. The glass-ceramic article as claimed in claim 14, wherein the thickness of said layer is within a range extending from 1000 to 1500 nm.

16. A process for the manufacture of an article made of glass-ceramic as claimed in claim 1, said article comprising at least one substrate made of glass-ceramic, in which at least one layer comprising zirconium silicon nitride, $Si_xZr_yN_z$, with an atomic ratio of Zr to the sum Si+Zr, y/(x+y), of 10% to 90% is deposited on at least one zone of said substrate.

17. The process as claimed in claim 16, wherein said substrate, thus coated, is subjected to a tempering treatment or to an annealing each at a temperature of 750° C. to 900° C.

18. The process as claimed in claim 16, wherein the deposition of said layer is carried out by cathode sputtering.

19. A glass-ceramic article, comprising at least one substrate made of glass-ceramic, said substrate being coated in at least one zone with at least one layer comprising zirconium silicon nitride, $Si_xZr_yN_z$, with an atomic ratio of Zr to the sum Si+Zr, y/(x+y), of 10% to 90%, wherein the glass-ceramic article is a cooking device additionally comprising one or more heating elements.

\* \* \* \* \*